United States Patent
Bui et al.

(10) Patent No.: US 8,023,223 B2
(45) Date of Patent: Sep. 20, 2011

(54) COMBINING INFORMATION FROM PARALLEL SERVO CHANNELS

(75) Inventors: Nhan X. Bui, Tucson, AZ (US);
Giovanni Cherubini, Rueschlikon (CH);
Roy D. Cideciyan, Rueschlikon (CH);
Robert A. Hutchins, Tucson, AZ (US);
Jens Jelitto, Rueschlikon (CH);
Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/878,722

(22) Filed: Sep. 9, 2010

(65) Prior Publication Data

US 2011/0007418 A1   Jan. 13, 2011

Related U.S. Application Data

(62) Division of application No. 12/400,420, filed on Mar. 9, 2009, now Pat. No. 7,839,599.

(51) Int. Cl.
G11B 5/584 (2006.01)
G11B 21/02 (2006.01)

(52) U.S. Cl. .................................. 360/77.12; 360/75

(58) Field of Classification Search .................. None
See application file for complete search history.

(56) References Cited

U.S. PATENT DOCUMENTS

| | | | |
|---|---|---|---|
| 5,311,380 A | 5/1994 | Murata et al. | |
| 5,568,327 A | 10/1996 | Pahr et al. | |
| 5,717,538 A | 2/1998 | Cheung et al. | |
| 6,724,561 B1 | 4/2004 | Wyman | |
| 6,914,744 B1 | 7/2005 | Wang | |
| 6,992,857 B2 | 1/2006 | Knowles et al. | |
| 7,164,550 B2 | 1/2007 | Kisaka | |
| 7,193,812 B2 | 3/2007 | Eaton | |
| 2005/0052778 A1* | 3/2005 | Bui et al. | 360/77.12 |
| 2008/0151416 A1* | 6/2008 | Cherubini et al. | 360/77.14 |

* cited by examiner

*Primary Examiner* — Andrew L Sniezek
(74) *Attorney, Agent, or Firm* — Dan Shifrin

(57) ABSTRACT

A weighted combining scheme exploits information from two servo channels operating in parallel. A timing-based servo module comprises two synchronous servo channels coupled respectively to receive two digital servo signals read from a data tape. Both channels have outputs for an unweighted parameter estimate and for a measure of the channel reliability. A weight computation module provides first and second weight signals using the measures of channel reliability from the servo channels. An offset computation module provides first and second offset terms which are summed with the unweighted parameter estimates. Multiplying nodes receive the unweighted parameter estimates and the weight signals and outputs offset weighted parameter estimates. A summing node receives the offset weighted parameter estimates and outputs a combined offset weighted parameter estimate to a servomechanism.

9 Claims, 13 Drawing Sheets

COMBINING INFORMATION FROM PARALLEL SERVO CHANNELS

RELATED APPLICATION DATA

This application is a divisional application of, and claims priority from, commonly assigned and U.S. application Ser. No. 12/400,420, filed Mar. 9, 2009 now U.S. Pat. No. 7,839,599 and entitled COMBINING INFORMATION FROM PARALLEL SERVO CHANNELS. The present application is also related to commonly-assigned and co-pending U.S. application Ser. No. 12/400,369, entitled COMBINING INFORMATION FROM PARALLEL SERVO CHANNELS, also filed on Mar. 9, 2009, and to U.S. application Ser. No. 12/878,704 entitled COMBINING INFORMATION FROM PARALLEL SERVO CHANNELS and filed on the same filing date as the present application. All of the above-referenced applications are incorporated herein by reference in their entireties.

TECHNICAL FIELD

The present invention relates generally to linear tape drives and, in particular, to timing-based servo technology used to determine the longitudinal and transverse positions of the tape head.

BACKGROUND ART

Timing-based servo (TBS) is a technology developed for linear tape drives. In TBS systems, recorded servo patterns consist of transitions with two different azimuthal slopes. Head lateral position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). A specification for the servo format in current midrange tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com. Traditionally, the detection of LPOS information bits is based on the observation of the shifts of the arrival times of the dibit peaks within the servo bursts at the servo reader output (R. C. Barrett, E. H. Klaassen, T. R. Albrecht, G. A. Jaquette, and J. H. Eaton, "Timing-based track-following servo for linear tape systems", IEEE Transactions on Magnetics, Vol. 34, Issue 4, Part 1, pp. 1872-1877, July 1998). Detection of LPOS bits may also be performed by a matched-filter detector (G. Cherubini, E. Eleftheriou, R. Hutchins, and J. Jelitto, "Synchronous Servo Channel for Tape Drive Systems," U.S. application Ser. No. 11460,987, filed Jul. 30, 2006).

In tape drives, two dedicated servo channels are normally available from which LPOS information and PES can be derived. One of the two available servo channels is initially selected to provide the LPOS information and PES. The initial selection is maintained as long as satisfactory channel operation is observed. If the performance of the selected servo channel deteriorates, the drive switches to the other servo channel to obtain the required LPOS information and PES. In an alternative method, the two servo channels provide reliability information about LPOS symbols and PES, and the LPOS symbol and PES having the highest assigned reliability are chosen. However, the signal from one servo reader may occasionally fade while the signal from the other reader might not be affected. In such an event, the servo channel affected by fading loses timing and needs to undergo re-acquisition of the channel parameters. Consequently, additional latency and loss of information is experienced.

SUMMARY OF THE INVENTION

The present invention provides a novel weighted combining scheme to exploit information from two servo channels operating in parallel. In one embodiment, a timing-based servo module is provided in a linear tape drive. The servo module comprises first and second synchronous servo channels coupled respectively to receive first and second digital servo signals read from a data tape by servo elements. The first synchronous servo channel comprises a first output for a first parameter estimate, such as a lateral position estimate or a tape velocity estimate, and a second output for a first measure of the channel reliability. Similarly, the second synchronous servo channel comprises a first output for a second parameter estimate and a second output for a second measure of the channel reliability. The servo module further comprises a weight computation module operable to provide a first weight signal and a second weight signal using the measures of channel reliability from the first and second synchronous servo channels.

The servo module also comprises an offset computation module operable to provide a first offset term and a second offset term using the first and second measures of reliability and the first and second parameter estimates from the first and second synchronous servo channels. Additionally, a first summing node is coupled to receive the first parameter estimate and the first offset term and a second summing node coupled to receive the second parameter estimate and the second offset term. The servo module also comprises first and second multiplying nodes. The first multiplying node is coupled to receive an output from the first summing node and the first weight signal and is operable to output a first offset parameter estimate. The second multiplying node is coupled to receive the second parameter estimate and the second weight signal and is operable to a second offset parameter estimate. The servo module further comprises a summing node coupled to receive the first and second offset parameter estimates and operable to output a combined offset parameter estimate to a servomechanism, such as a track-following servomechanism.

Another embodiment provides a data storage tape drive which comprises, among other components, a timing-based servo module of the previous embodiment. Further embodiments provide methods for track-following using a parameter estimate of a timing-based servo module in a linear tape drive and a computer program product having computer-readable code embodied therein for track-following using a parameter estimate from parallel channels of a timing-based servo module in a linear tape drive.

DETAILED DESCRIPTION OF THE PREFERRED EMBODIMENT

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices.

Furthermore, the described features, structures, or characteristics of the invention may be combined in any suitable manner in one or more embodiments. In the following description, specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

The logical flow chart diagrams that follow are generally indicative of one embodiment of the presented process. Other steps and processes may be conceived that are equivalent in function, logic, or effect to one or more steps, or portions thereof, of the illustrated process. Additionally, the format and symbols employed are provided to explain the logical steps of the process and are understood not to limit the scope of the process. And, the order in which a particular process occurs may or may not strictly adhere to the order of the corresponding steps shown.

Figure 1:
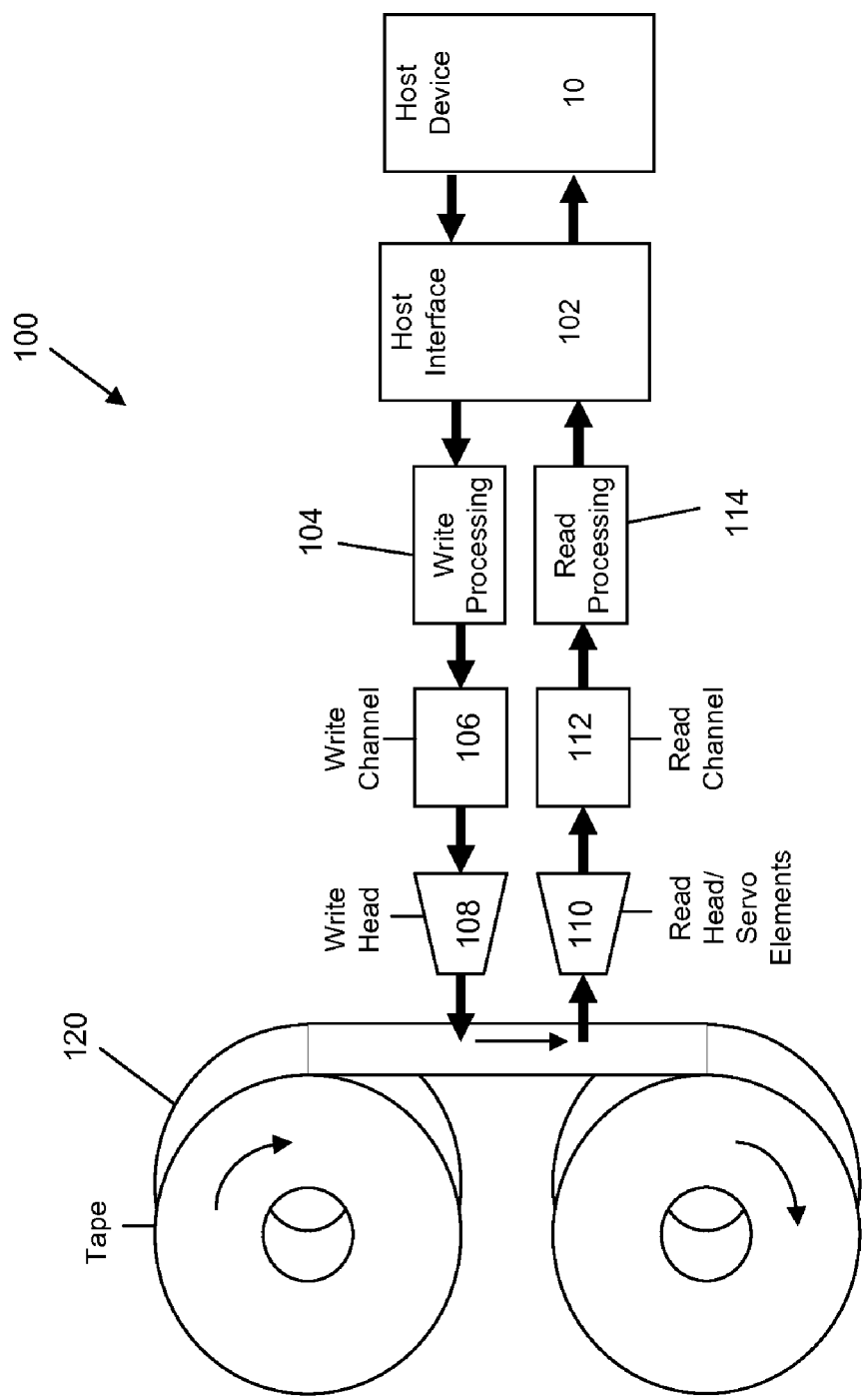
FIG. 1 is a block diagram of a data tape drive in which the present invention may be implemented.

FIG. 1 is a block diagram of a data tape drive 100 in which the present invention may be implemented. The drive 100 is coupled to a host device 10 with a host interface 102 through which data and commands are communicated. Data to be written to the tape 120 is processed in a write processing module 104 and a write channel 106 before being written to the tape 120 moving past a write head 108. Data is read from the tape 120 moving past a read head 110 and processed by a read channel 112 and a read processing module 114 before being transmitted to the host device 10 through the host interface 102. Details of these steps and components are well known in the art and are not necessary to an understanding of the present invention.

As is also known, the tape 120 is formatted into a number of parallel data tracks, such as 512. Servo bands are interleaved among the data tracks and are formatted in a pattern to provide longitudinal position (LPOS) information and a transversal position error signal (PES). In addition to the read head 110 having multiple elements to read data simultaneously from multiple tracks, the read head 110 also includes a number of servo elements to detect the servo information from the servo bands. For example the read head may include two servo elements to detect the servo patterns on two servo bands between which are parallel data tracks.

Figure 2:
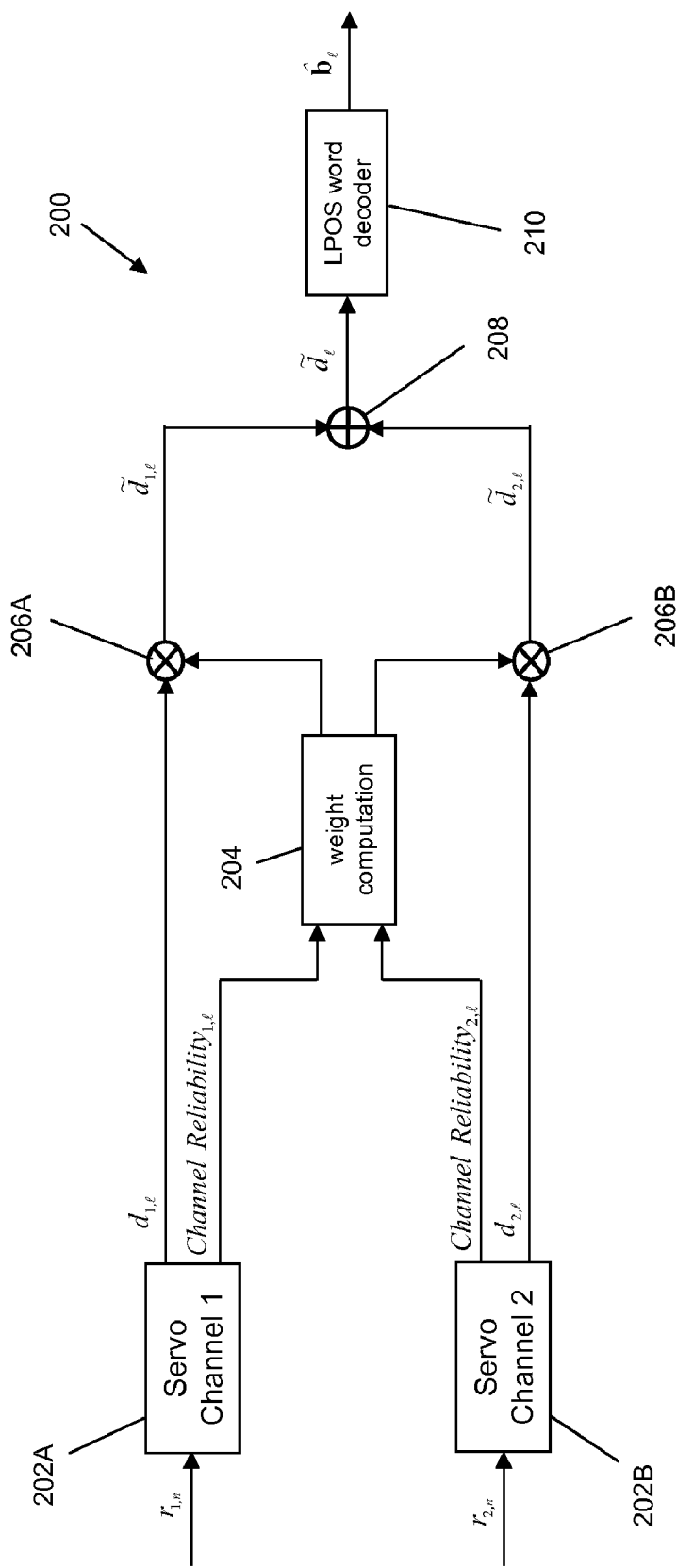
FIG. 2 is a block diagram of one embodiment of a timing-based servo module of the present invention introducing weighted combining of soft information from the servo channels to improve the reliability of LPOS bit detection.

FIG. 2 is a block diagram of one embodiment of a timing-based servo module 200 of the present invention. As illustrated in FIG. 2, signals from the two servo elements are processed by two synchronous servo channels 202A, 202B.

The optimum matched-filter detection of LPOS symbols and concurrent monitoring of the reliability of the LPOS detection process in a servo channel is based on a metric, which for a binary LPOS symbol $b_l \in \{0,1\}$ yields the likelihood of the two hypotheses $H_{b_l=0}$ and $H_{b_l=1}$. A sequence of [4 4 5 5] dibits is characteristic of the sequence of C, D, A, and B servo bursts of a servo frame in LTO tape drives. The encoding of LPOS symbols is obtained by applying PPM to the second and fourth dibit of the A and B bursts. Recalling the formulation of the optimum matched-filter receiver for the detection of waveform signals from a given set in the presence of additive white Gaussian noise (AWGN), the likelihood of the hypothesis $H_{b_l=\beta}$, $\beta \in \{0,1\}$ is represented by the metric values $m_{\beta,l} = m(r_l | b_l = \beta)$, $\beta \in \{0,1\}$, where $r_l$ denotes the vector of received signal samples in the l-th servo frame. In an individual servo channel, an optimum LPOS symbol detector computes the metric values $m_{\beta,l}$, $\beta=0,1$, and compares them to produce a decision $\hat{b}_l$ on the LPOS symbol encoded in the l-th servo frame, i.e., $$\hat{b}_\ell = \begin{cases} 0, & \text{if } m_{0,\ell} \le m_{1,\ell} \\ 1, & \text{otherwise.} \end{cases} \quad (1)$$

Weighted combining of soft information from the servo channels is introduced to improve the reliability of LPOS bit detection. In this manner, optimal use is made of the total available LPOS information from the two servo channels 202A, 202B. Preferably, the soft information from each servo channel is provided by a matched-filter detector. The soft information on LPOS detection is then given by the value of the metrics that the matched-filter detector computes for the two hypotheses corresponding to the binary LPOS symbols. At each servo frame an individual servo channel outputs soft information on a detected LPOS symbol that is given by the metric value $$d_{\zeta,\ell} = m_{0,\ell}^{(\zeta)} - m_{1,\ell}^{(\zeta)}, \quad (2)$$

and a measure of the servo channel reliability where the index $\zeta$ takes values 1 and 2 for servo channels 202A and 202B, respectively.

The weights are derived in a weight computation module 204 from the measure of the channel reliability that is presented at the output of each servo channel. A first weight signal from the weight computation module 204 is used by a first multiplying node 206A to multiply unweighted metrics $d_{1,l}$ from the first servo channel 202A by a first weight to generate weighted metrics $\tilde{d}_{1,l}$ for the first channel 202A. Similarly, a second weight signal from the weight computation module 204 is used by a second multiplying node 206B to multiply unweighted metrics $d_{2,l}$ from the second servo channel 202B by a second weight to generate weighted metrics $\tilde{d}_{2,l}$ for the second channel 202B. A summing node 208 adds the two weighted metrics and outputs a combined weighted metric $\tilde{d}_l$ to an LPOS word decoder 210. The LPOS word decoder produces a decision $\hat{b}_l$ on the LPOS symbol encoded in the l-th servo frame, given by $$\hat{b}_\ell = \begin{cases} 0, & \text{if } \tilde{d}_\ell \le 0 \\ 1, & \text{otherwise.} \end{cases} \quad (3)$$

By using the metric adopted for hypothesis testing, a measure of the signal-to-distortion ratio (SDR) associated with LPOS detection is introduced, which allows monitoring of the LPOS detection process and of the reliability of the LPOS symbol decisions. The adopted measure of the signal-to-distortion ratio is directly proportional to the square of the difference of the average values of the metrics for correct and incorrect hypotheses and inversely proportional to the sum of the variances of the metrics for correct and incorrect hypotheses. Defining the quantities $M_C$ and $\sigma_{M_C}^2$ to denote the mean and the variance of the metric for the correct hypothesis, respectively, and $M_I$ and $\sigma_{M_I}^2$ to denote the mean and the variance of the metric for the incorrect hypothesis, respectively, the average signal-to-noise plus distortion ratio at the detection point of a servo channel is estimated as $$SDR = 20\log\left(\frac{|M_I - M_C|}{\sqrt{\sigma_{M_I}^2 + \sigma_{M_C}^2}}\right). \quad (4)$$

Figure 3:
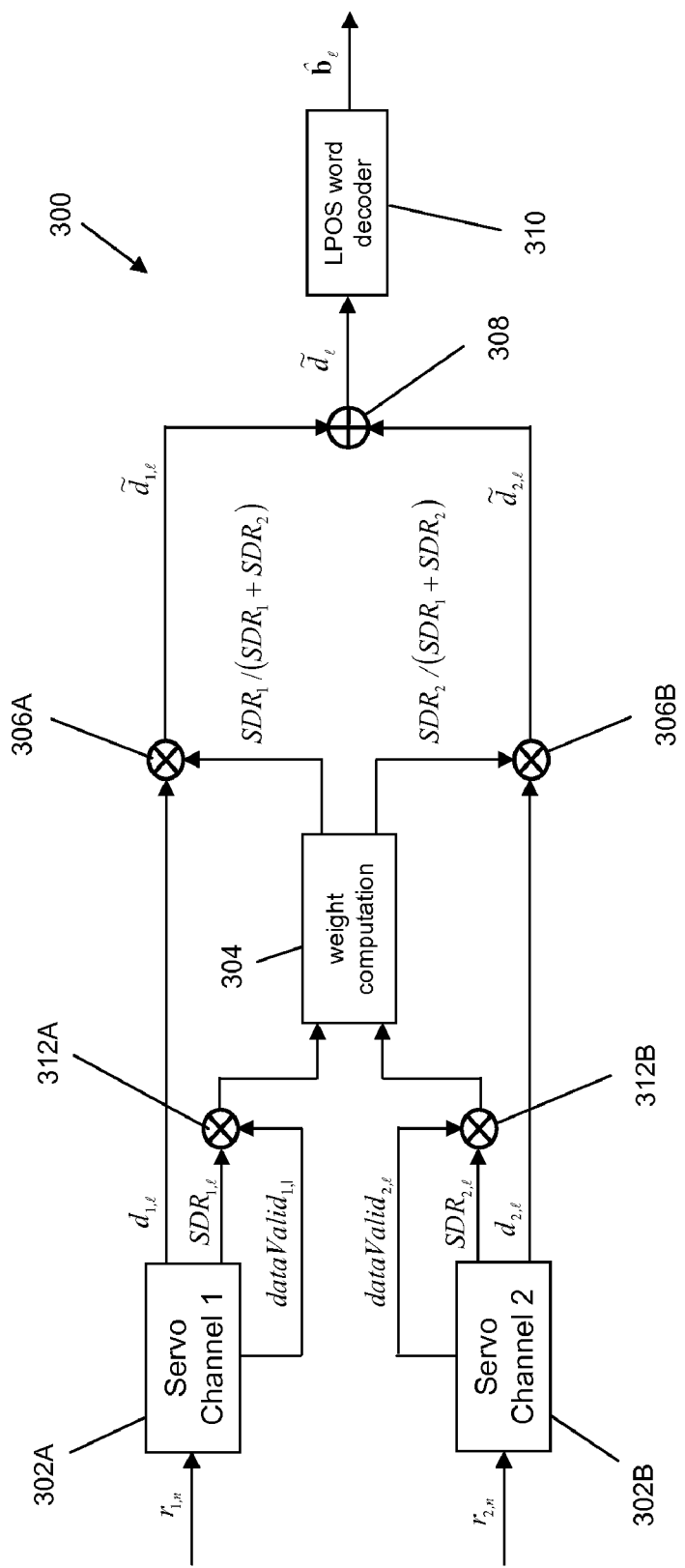
FIG. 3 is a block diagram of another embodiment of a timing-based servo module of the present invention introducing weighted combining of soft information from the servo channels, where signal to distortion ratios from the servo channels are used to improve the reliability of LPOS bit detection.

FIG. 3 is a block diagram showing another embodiment of weighted combining of soft information from the servo channels, which is introduced to improve the reliability of LPOS bit detection, where an estimate of the SDR is used as a measure of channel reliability. The SDR is denoted by $SDR_{\zeta,l}$, where the index $\zeta$ takes values 1 and 2 for servo channels 302A and 302B, respectively.

The weights are derived in a weight computation module 304 from the measure of the SDR that is presented at the output of each servo channel. A first weight signal from the weight computation module 304, $SDR_1(SDR_1+SDR_2)$, is used by a first multiplying node 306A to multiply unweighted metrics from the first servo channel 302A by a first weight to generate weighted metrics $\tilde{d}_{1,l}$ for the first channel 302A. Similarly, a second weight signal from the weight computation module 304, $SDR_2(SDR_1+SDR_2)$, is used by a second multiplying node 306B to multiply unweighted metrics from the second servo channel 302B by a second weight to generate weighted metrics $\tilde{d}_{2,l}$ for the second channel 302B. A summing node 308 adds the two weighted metrics and outputs a combined weighted metric $\tilde{d}_l$ to an LPOS word decoder 310. The LPOS word decoder produces a decision $\hat{b}_l$ on the LPOS symbol encoded in the l-th servo frame, given by (4).

Each servo channel 302A, 302B may also output a flag, such as a dataValid signal, indicating whether the servo channel is operating correctly, in which case it assumes a value equal to one. Interruption of proper servo channel operation, signaled by a dataValid signal assuming zero value, may be determined, e.g., by a fading event. A node 312A, 312B associated with each channel serves to prevent the SDR signal from being transmitted to the weight computation module 304 in the manner of a switch, whenever the dataValid signal assumes zero value.

Figure 4:
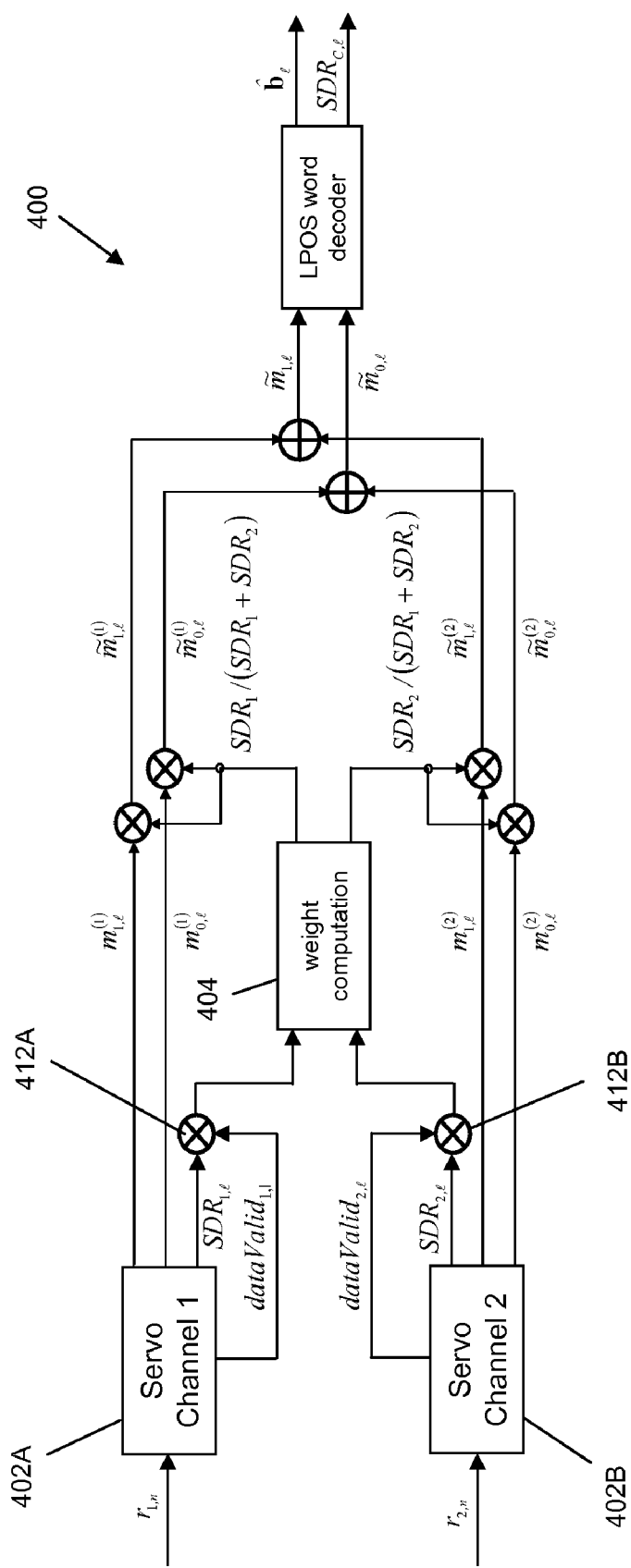
FIG. 4 is a block diagram of a third embodiment of a timing-based servo module of the present invention introducing weighted combining of soft information from the servo channels, where signal to distortion ratios from the servo channels are used to improve the reliability of LPOS bit detection.

FIG. 4 is a block diagram of a third embodiment of a timing-based servo module 400 of the present invention. At each servo frame an individual servo channel directly outputs the soft information on a detected LPOS symbol that is given by the metric values $m_{0,l}^{(\zeta)}$ and $m_{1,l}^{(\zeta)}$, and an estimate of the SDR denoted by $SDR_{\zeta,l}$, where the index $\zeta$ takes values 1 and 2 for servo channels 402A and 402B, respectively. The weights are derived as in the first embodiment in a weight computation module 404 from the measure of the SDR that is presented at the output of each servo channel. A first weight signal from the weight computation module 404, $SDR_1(SDR_1+SDR_2)$, is used by multiplying nodes to multiply unweighted metrics from the first servo channel 402A by a first weight to generate weighted metrics $\tilde{m}_{0,l}^{(1)}$ and $\tilde{m}_{1,l}^{(1)}$ for the first channel 402A. Similarly, a second weight signal from the weight computation module 404, $SDR_2(SDR_1+SDR_2)$, is used by a second multiplying node 406B to multiply unweighted metrics from the second servo channel 402B by a second weight to generate weighted metrics $\tilde{m}_{0,l}^{(2)}$ and $\tilde{m}_{1,l}^{(2)}$ for the second channel 402B. A first summing node adds the weighted metrics $\tilde{m}_{0,l}^{(1)}$ and $\tilde{m}_{1,l}^{(2)}$ to yield a combined weighted metric $\tilde{m}_{0,l}$, whereas a second summing node adds the weighted metrics $\tilde{m}_{1,l}^{(1)}$ and $\tilde{m}_{1,l}^{(2)}$ to yield a combined weighted metric $\tilde{m}_{1,l}$. The LPOS word decoder produces a decision $\hat{b}_l$ on the LPOS symbol encoded in the l-th servo frame, given by $$\hat{b}_\ell = \begin{cases} 0, & \text{if } \tilde{m}_{0,\ell} \le \tilde{m}_{1,\ell} \\ 1, & \text{otherwise.} \end{cases} \quad (5)$$

The performance of the systems in the embodiments is the same. In the third embodiment, however, the word decoder also computes an estimate of the SDR after combining, denoted by $SDR_{C,l}$, based on the statistics of the weighted metrics $\tilde{m}_{1,l}^{(1)}$ and $\tilde{m}_{1,l}^{(2)}$, as indicated in (4).

Figure 5:
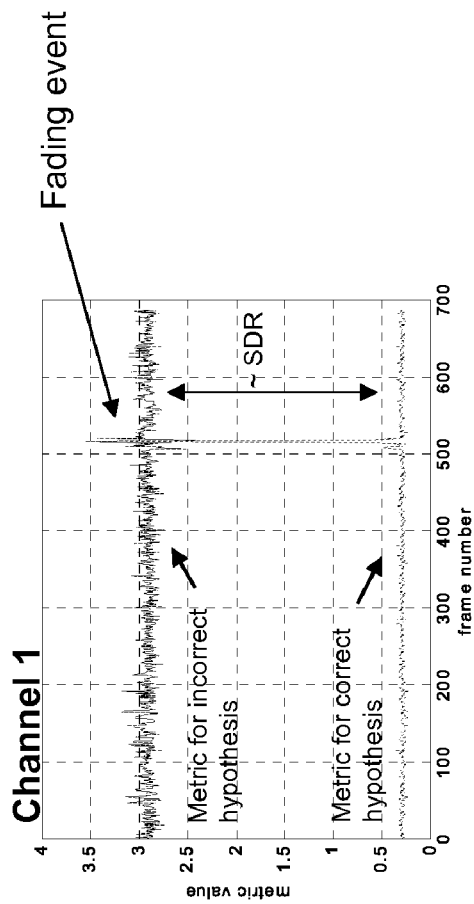
FIG. 5 is a set of plots of metric values for two servo channels, one of which has experienced a fading event.

FIG. 5 shows graphs illustrating a set of plots of metric values generated by both of the servo channels. The upper line in each graph represents the frame-by-frame metric value generated by the servo channel based upon an incorrect hypothesis, while the lower line in each graph represents the metric value generated by the servo channel based upon the correct hypothesis. The distance between the two plot lines may be regarded as an approximation of the SDR. The smaller the separation between the two plot lines, the smaller the SDR and the greater the probability of an error by the servo channel in accurately decoding the information from the servo pattern. The graph for the first channel shows a fading event at approximately frame 510. It can be seen that the metric values for the correct and incorrect hypothesis are very close together during the fading event. Because the second channel does not experience a fading event, adequate separation between the two plot lines, and therefore sufficiently large SDR, is maintained. However, if the tape drive 100 is then relying on the first servo channel when the fading event occurs, there is a non-negligible probability of error in LPOS symbol detection.

Figure 6:
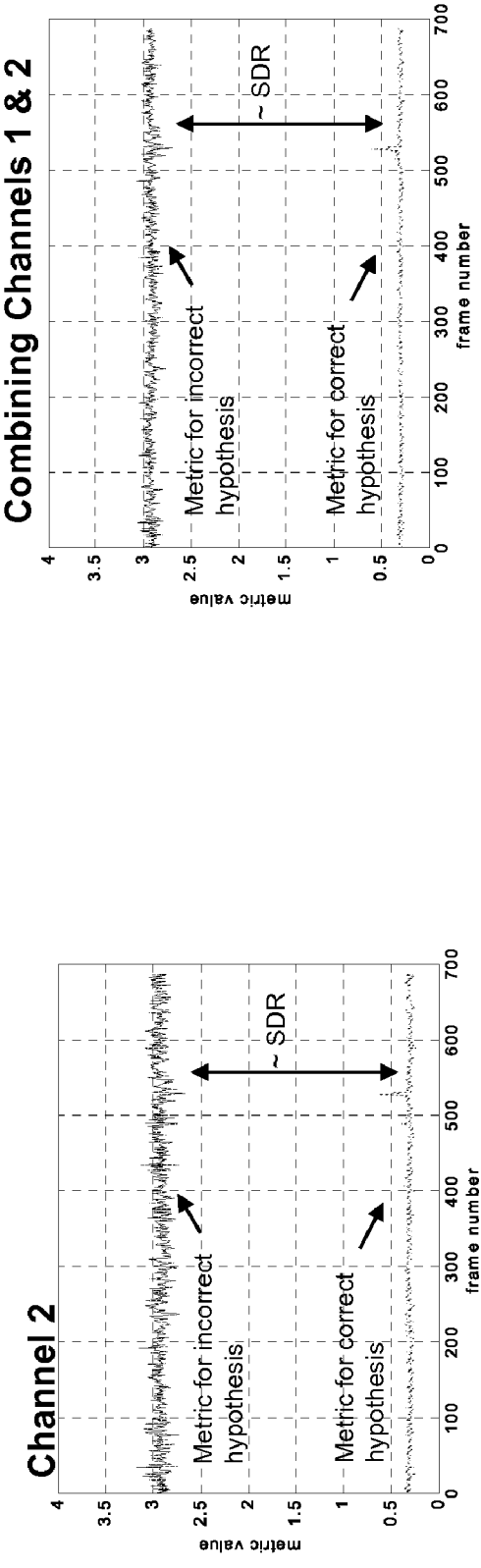
FIG. 6 is a plot of metric values for the two servo channels after being combined by the present invention during the same servo frames as shown in FIG. 2.

FIG. 6 is a plot showing the metric values for the correct and incorrect hypothesis after being weighted and combined in accordance with the second embodiment of the present invention. FIG. 6 illustrates the restoration of an adequate SDR during the fading event of the first channel.

Figure 7B:
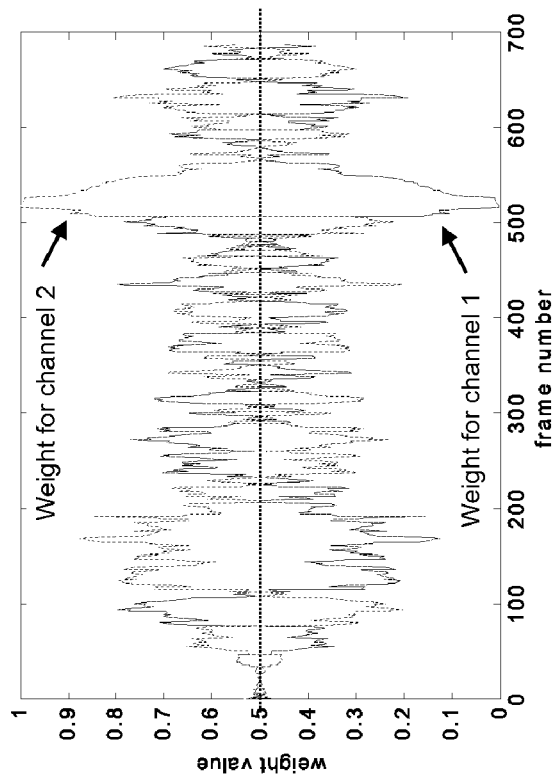
FIG. 7B is a plot of the weight values of the outputs of the two servo channels during the same servo frames as shown in FIG. 5A.
Figure 7A:
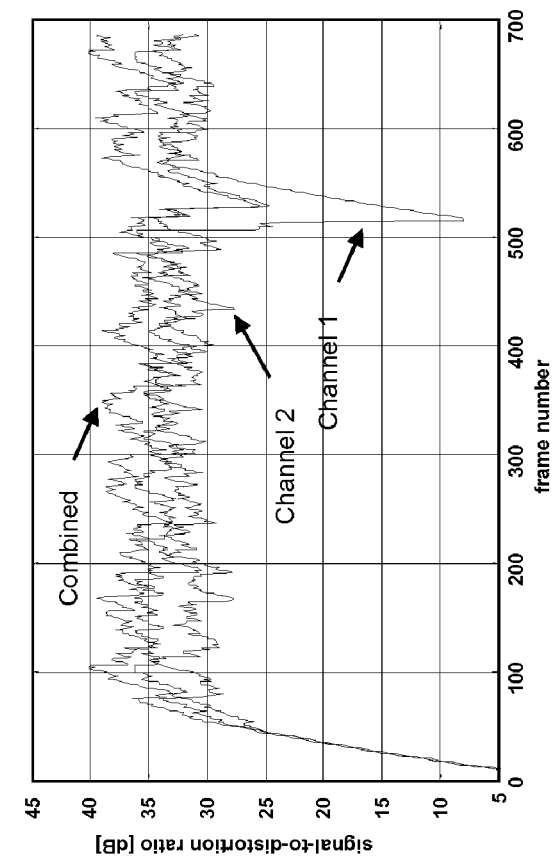
FIG. 7A is a plot of the signal to distortion ratios of the outputs of the two servo channels separately and when combined.

FIG. 7A is a plot of the SDR of the two servo channels 302A, 302B and the combined SDR generated by the timing-based servo module 300 in accordance with the second embodiment of the present invention. The value of the combined SDR is significantly higher than the values of the SDR provided by the individual servo channels, which indicates the higher reliability of LPOS decoding obtained by the combining method. The plot of FIG. 7B illustrates the values assumed by the weights for the two channels, which are output by the weight computation module 304. During the fading event of the first channel 302A, the weight for the metric provided by the first channel is close to or at zero. The dotted line indicates a weight value equal to 0.5 for both the two channels. It corresponds to equal-gain combining, which is usually adopted in systems where no reliability information on the symbol decisions is provided by the individual channels.

Figure 8:
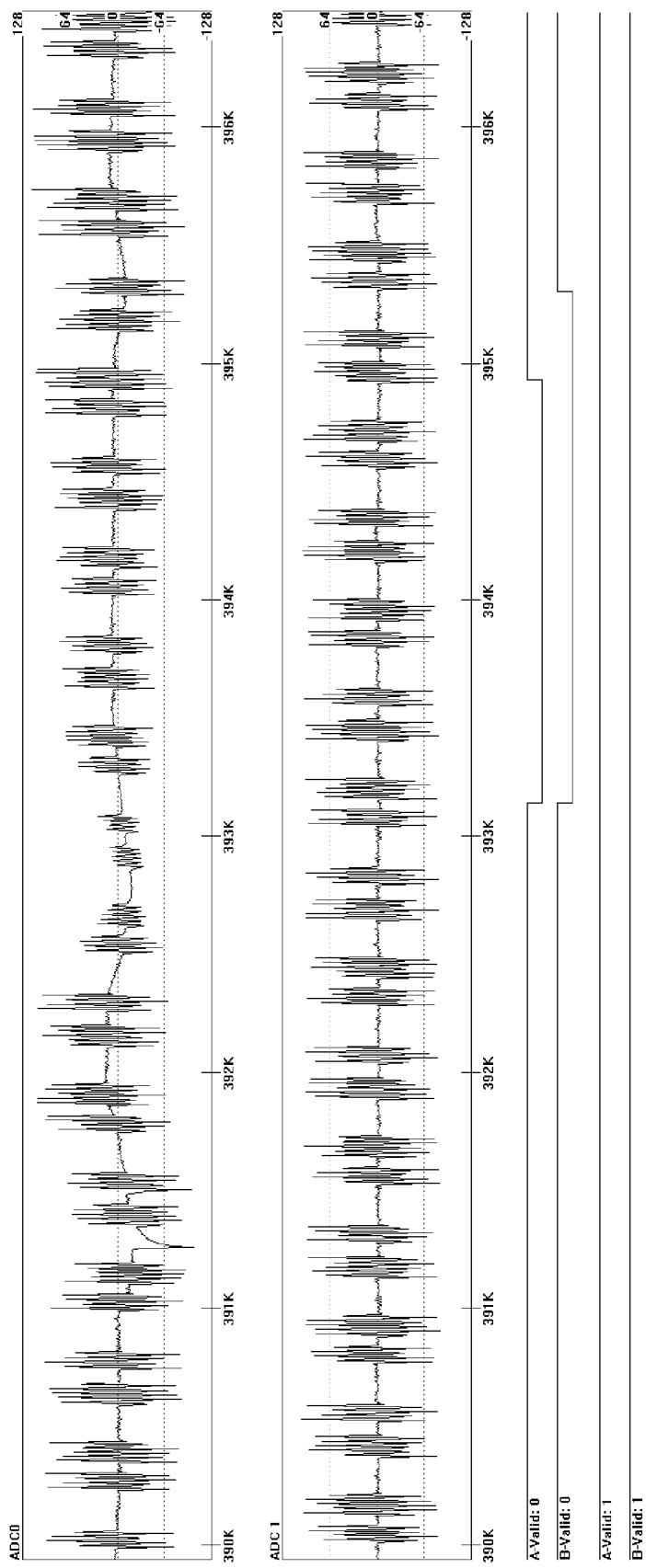
FIG. 8 is a plot of the input of the two servo channels illustrating the displacement of the relative longitudinal position of the servo frames and a fading event in one of the servo channels.

FIG. 8 shows at the top sequences ADC0 and ADC1 of servo signal samples that are input to the first and second servo channels, respectively. The units on the horizontal axis correspond to normalized time. The two sequences ADC0 and ADC1 contain the same information encoded in the A, B, C, D servo bursts, as mentioned earlier. However, there is a displacement of the servo pattern of one band relative to the other, which results in a delay of sequence ADC0 relative to sequence ADC1. The fading event on sequence ADC0 causes channel 1 to lose timing while reading the frame that ends at about time index 393K. As a consequence, the dataValid flags for channel 1 assume value equal to zero. Re-synchronization is completed three frames later, when the dataValid flags assume again value equal to one.

Figure 9:
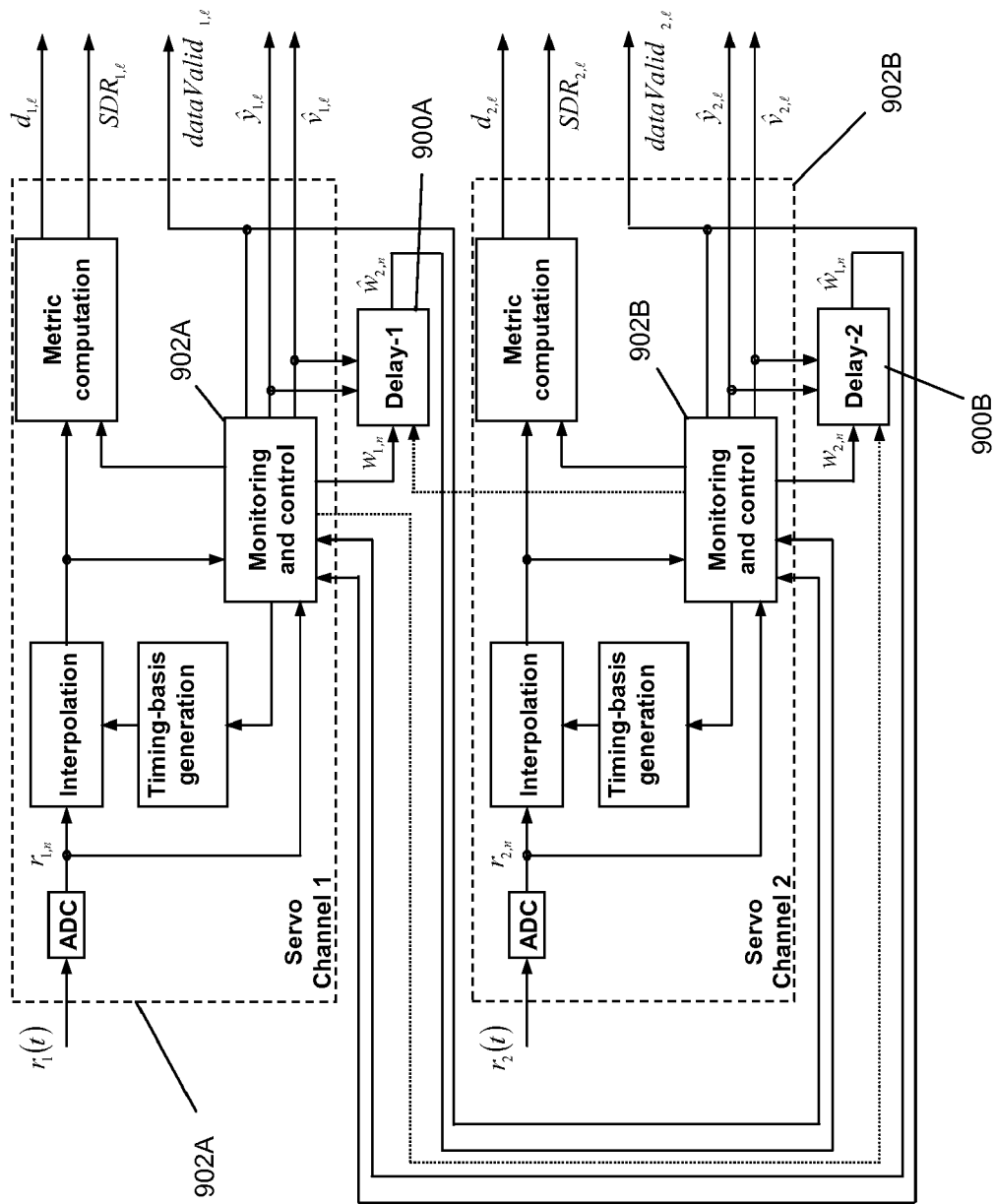
FIG. 9 is a block diagram of another embodiment of the present invention in which pseudo-timing signals are generated.

In a further embodiment, illustrated in the block diagram of FIG. 9, timing information is continuously provided from one channel to the other. In case one channel loses timing, due, for example, to fading of the servo reader signal, the fading channel continues to monitor the servo reader signal based on the timing information from the good channel. This is possible if the relative position in the longitudinal direction of frames in two servo bands is known. Preferably, the relative position of the servo frames is defined by the LTO standard. For example, in the LTO 1-4 standards, the relative position corresponds to a displacement of 33.33 or 66.66 μm, with a tolerance of +/−4.16 μm. Thus the timing relationship between the signals input to the two servo channels 902A, 902B is also known due to the tape velocity being estimated with high precision. Alternatively, the relative position can be measured by using synchronization patterns from the individual servo channels. The timing information is sent by a delay element 900A, 900B in the "good" channel to a monitoring and control module 902A, 902B in the "bad" channel, with a delay that depends on the relative displacement of the servo bands and on the tape velocity. Such timing information may be viewed as a pseudo-timing signal to permit the bad channel to maintain synchronization and immediately detect the beginning of servo bursts at the end of the fading event. Therefore, the need for re-synchronization after a fading event is avoided, thus avoiding additional latency and loss of LPOS information.

Figure 10:
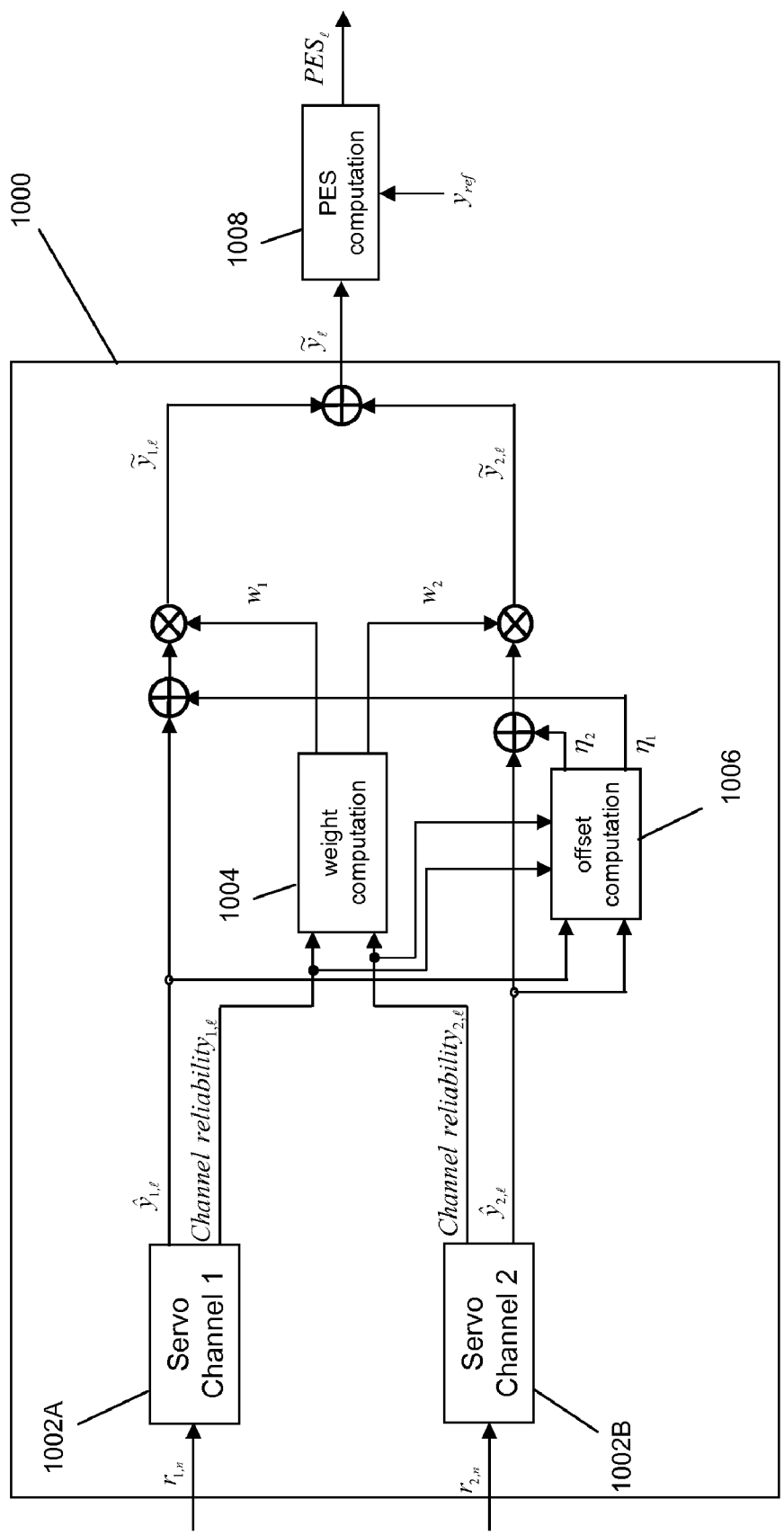
FIG. 10 is a block diagram of another embodiment of a timing-based servo module of the present invention, in which lateral position offset compensation and combining of lateral position estimates is performed.

In a third aspect of the invention, parameter estimates, such as tape velocity estimates or, as described herein, lateral position estimates from the two parallel servo channels, to name just two, are continuously compared, as illustrated in block 1000 of FIG. 10. Offset terms $\eta_1$ and $\eta_2$ are also computed to compensate for differences between the lateral position estimates from the two servo channels. Preferably the offset terms are given by $$\eta_1 = -\frac{1}{2}(<\hat{y}_{1,\ell}> - <\hat{y}_{2,\ell}>) \quad (6)$$

and $$\eta_2 = \frac{1}{2}(<\hat{y}_{1,\ell}> - <\hat{y}_{2,\ell}>), \quad (7)$$

where $<\hat{y}_{1,l}>$ and $<\hat{y}_{2,l}>$ denote the average values of the lateral position estimates from the two servo channels 1002A and 1002B, respectively. The averaging of the lateral position estimates is performed within the offset computation block 1006. By applying compensation of the offset terms, discontinuities in the PES sequence due to switching between servo channels are avoided, which otherwise might lead to undesired effects, e.g., stop-write events in case the difference between lateral position estimates is of the order of a few micrometers.

In the embodiment of FIG. 10, after compensating for offset terms and weighting, the resulting values $\tilde{y}_{1,l}$ and $\tilde{y}_{2,l}$ are expressed as $$\tilde{y}_{1,l} = w_1(\hat{y}_{1,l} + \eta_1) \quad (8)$$

and $$\tilde{y}_{2,l} = w_1(\hat{y}_{2,l} + \eta_2) \quad (9)$$

where $w_1$ and $w_2$ denote the weights computed in block 1004 for the two servo channels 1002A and 1002B, respectively. The weights are preferably obtained from the information on channel reliability provided by each servo channel. Simplified weighting schemes, such as equal gain combining ($w_1 = w_2$), or selection combining, i.e., usage of the best channel only, may also be employed. The values $\tilde{y}_{1,l}$ and $\tilde{y}_{2,l}$ are then combined to yield the combined lateral position estimate $\tilde{y}_l$, given by $$\tilde{y}_l = \tilde{y}_{1,l} + \tilde{y}_{2,l}. \tag{10}$$

The combined lateral position estimate $\tilde{y}_l$ is then input to the PES computation block 1008 to provide a correction term for a servomechanism, such as a track-following servomechanism.

Figure 11:
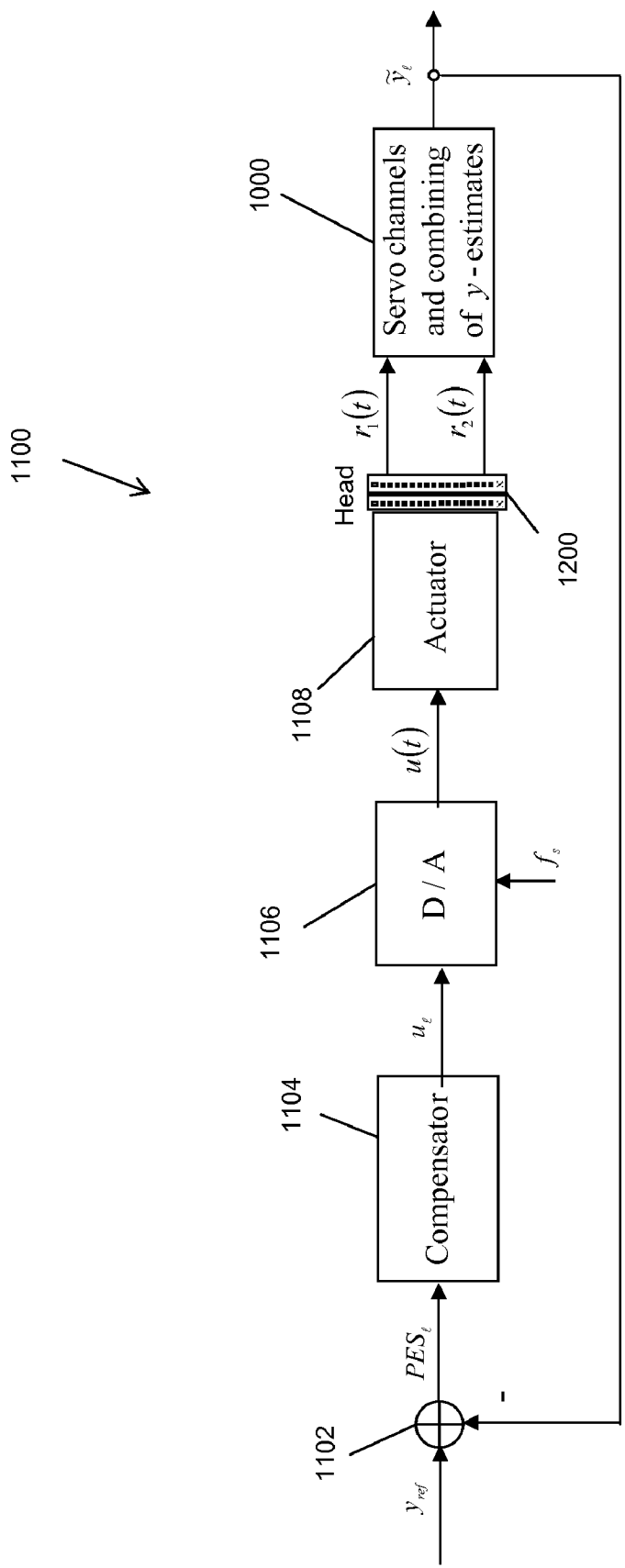
FIG. 11 is a block diagram of a track-following mechanism of a tape drive.
Figure 12:
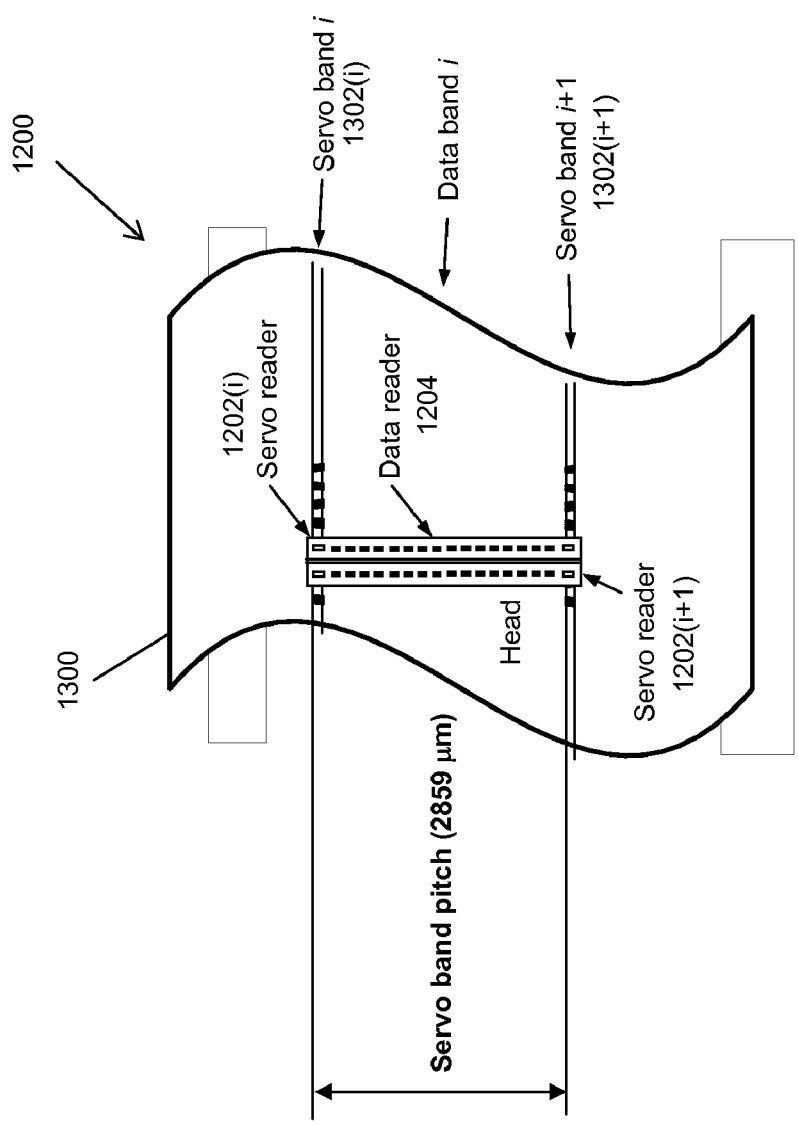
FIG. 12 illustrates servo read elements and data read and write elements on a tape head.

The combining scheme for the computation of the PES using the lateral position information from the two servo channels 1002A, 1002B is preferably part of the track-following mechanism 1100 of a tape drive, as illustrated in FIG. 11. The PES computation element 1102 subtracts the combined lateral position estimate $\tilde{y}_l$ from a reference value $y_{ref}$ to provide the position error signal $PES_l$. The PES is input to a digital compensator 1104, which provides a control signal $u_l$. The digital control signal is converted into an analog control signal by a digital-to-analog converter 1106, and input to an actuator 1108 for positioning of the head 1200 hosting the servo read sensors 1202 and the data read and write sensors 1204 relative to the tape 1300, as depicted in FIG. 12. The goal of the track-following servomechanism 1100 is to position the servo readers 1202 over the servo bands, collectively referred to as 1302, at a lateral position corresponding to the reference value $y_{ref}$. However, lateral expansion and contraction of the tape 1300 that are caused by variations in the environmental conditions are likely to determine a servo band pitch, i.e., the distance between centerlines of adjacent servo bands 1302(i), 1302(i+1), that deviates from the nominal value, which in the case of LTO drives is equal to 2859 μm. Current magnetic tape media exhibit a lateral dimensional change of a few hundred to one thousand ppm over the full environmental variation. The choice of the offset terms (6) and (7) optimizes the read margin, which is defined here as the minimum of the distances that separate the edges of data readers from the edges of the tracks being read.

Figure 13:
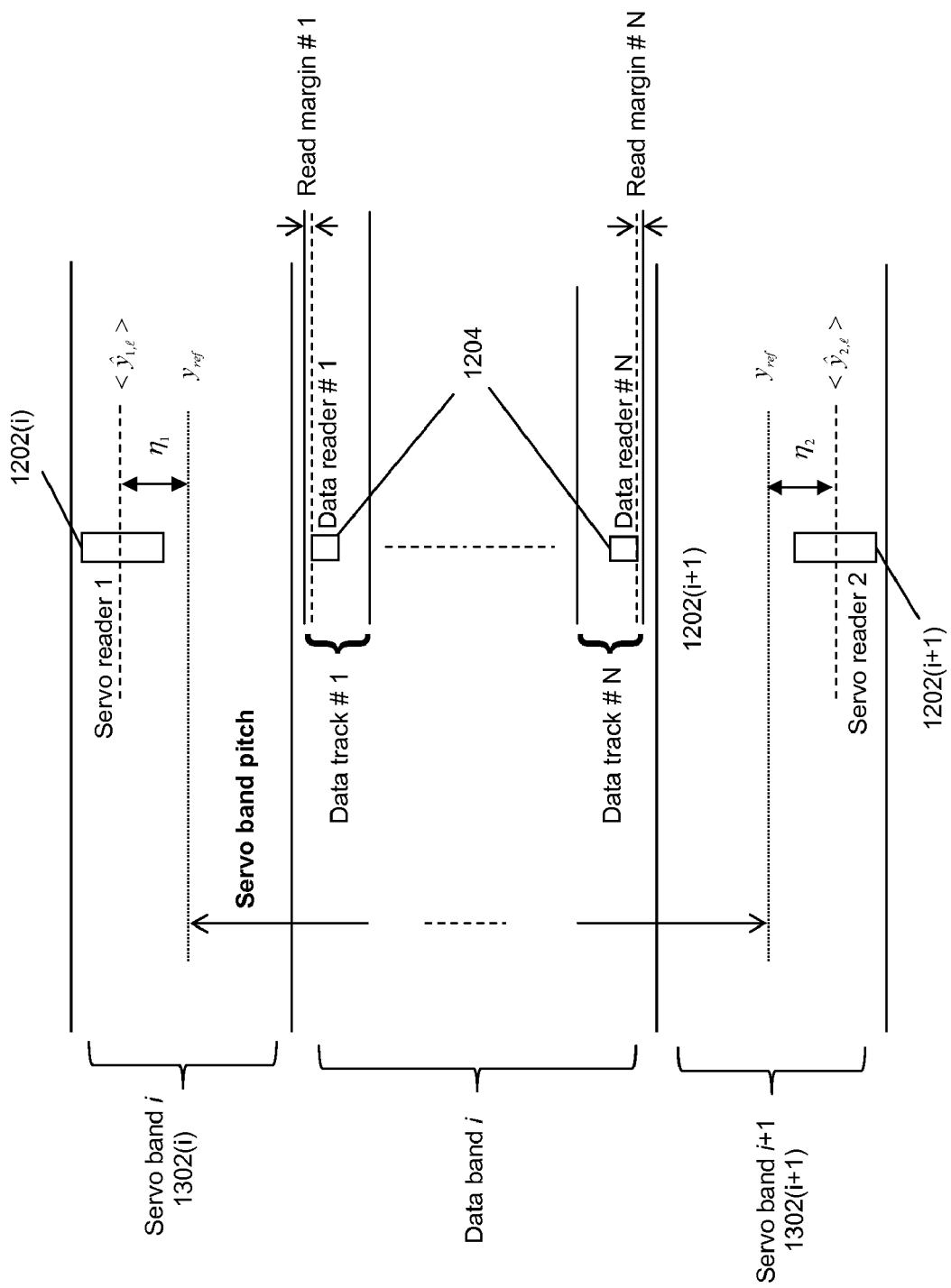
FIG. 13 illustrates the optimization of the read margin across all N data tracks to minimize the impact of transverse dimensional stability which is achieved with the present invention.

FIG. 13 illustrates the optimization of the read margin that is achieved by the present invention, where the number of parallel data channels is assumed equal to N. The optimization of the read margin is achieved by positioning the data readers for the two outermost data tracks so that the minimum distance between the edges of the data readers and the edges of the data tracks is maximized.

A further advantage of the proposed technique for combining the lateral position estimates from the two servo channels 1002A, 1002B is represented by the reduced value of the standard deviation of the position error signal, which is obtained by the inherent averaging of the noise components in the lateral position estimates. Minimization of the track misregistration and reduction of the standard deviation of the PES are of the utmost importance for the achievement of large track densities, and hence large capacities, of the order of 10 TB or more, that are envisaged for future generations of tape drives.

Figure 14:
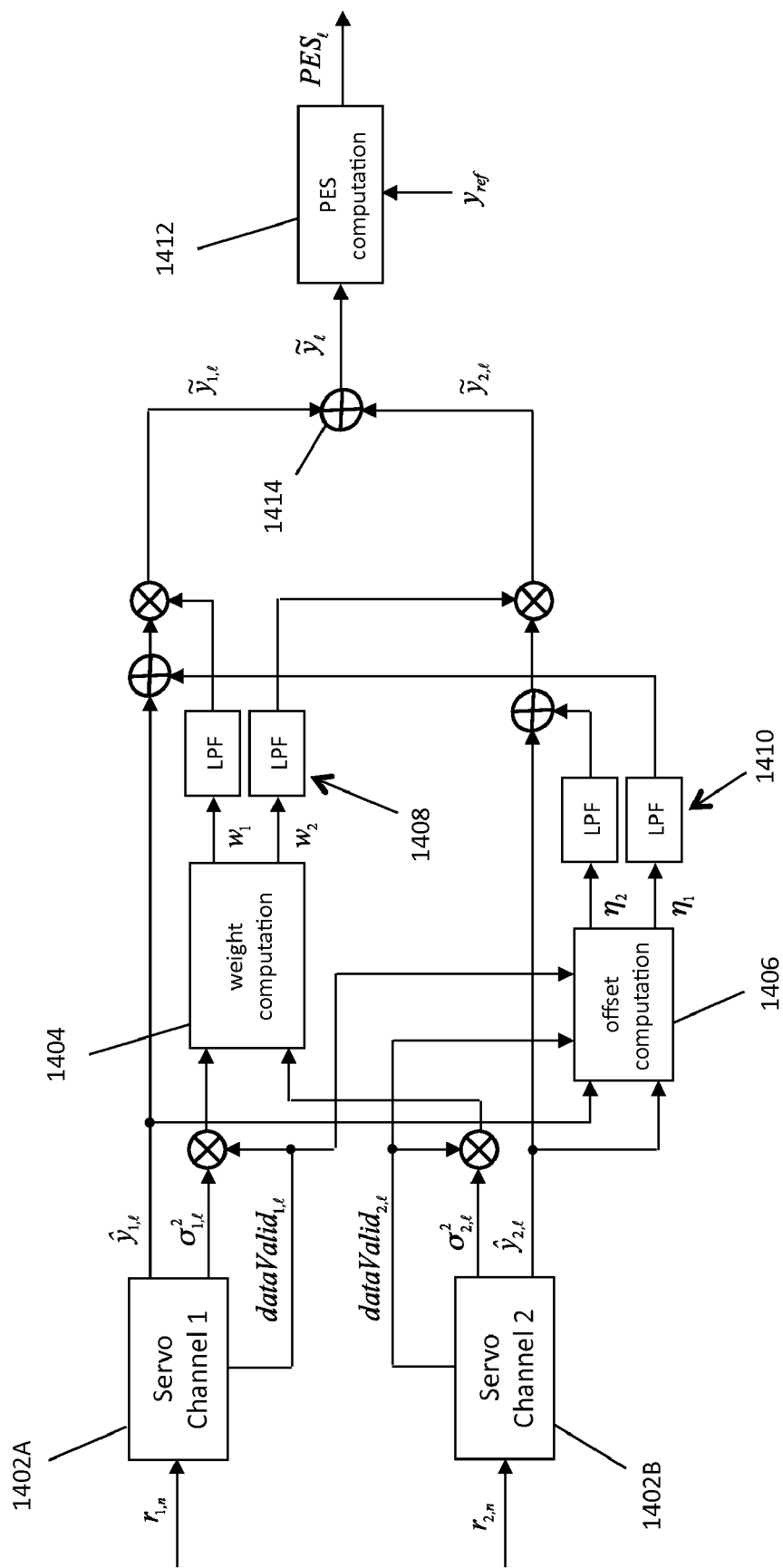
FIG. 14 is a block diagram of a further embodiment of the present invention.

A further embodiment of the present invention is illustrated in FIG. 14. The weights for combining are obtained by considering estimates $\sigma_{1,l}^2$ and $\sigma_{2,l}^2$ of the variances of the lateral position estimates, which are provided by the servo channels 1402A and 1402B, respectively. In particular, the weights are expressed as $$w_1 = \frac{\sigma_1^2}{\sigma_1^2 + \sigma_2^2} \tag{11}$$

and $$w_2 = \frac{\sigma_2^2}{\sigma_1^2 + \sigma_2^2}. \tag{12}$$

Each servo channel 1402A, 1402B outputs a flag, such as a dataValid signal, indicating whether the servo channel is operating correctly. Initially, the channel that asserts the dataValid signal first is chosen for providing PES for track-following servo. If it is channel 1402A, the weights are $w_1 = 1$, $w_2 = 0$ and the offset terms $\eta_1$ and $\eta_2$ are both zero. After channel 1402B asserts the dataValid signal, low-pass filtering of the weights 1408 and the offset terms 1410 guarantees a smooth transition from the initial situation, in which the PES is determined by block 1412 from a single channel, to the steady state in which the PES is determined by both channels via combining. In case one of the two channels loses timing during normal operation and sets the dataValid signal to zero, the offset computation unit 1406 freezes the offset terms $\eta_1$ and $\eta_2$. When the channel asserts again the dataValid signal, new offset terms are computed 1406 and provided to the combining module 1414 after low-pass filtering. Discontinuities in the PES sequence are thus avoided, which otherwise might lead to undesired effects, e.g., stop-write events in case the offset terms are of the order of a few micrometers.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for a track-following servomechanism that obtains information from parallel channels of a timing-based servo module in a linear tape drive.

What is claimed is:

1. A timing-based servo module in a linear tape drive, comprising:
   a first synchronous servo channel coupled to receive a first digital servo signal read from a data tape by a servo element, the first synchronous servo channel comprising:
      a first output for a first unweighted lateral position estimate; and
      a second output for a first lateral position estimate variance;

a second synchronous servo channel coupled to receive a second digital servo signal read from the data tape by the servo element, the second synchronous servo channel comprising:
- a first output for a second unweighted lateral position estimate; and
- a second output for a second lateral position estimate variance;

a weight computation module operable to:
- divide the first lateral position estimate variance by the sum of the first and second lateral position estimate variances to provide a first weight signal at a first output; and
- divide the second lateral position estimate variance by the sum of the first and second lateral position estimate variances to provide a second weight signal at a second output;

an offset computation module operable to provide a first offset term at a first output and a second offset term at a second output using first and second measures of reliability of the first and second synchronous channels and the first and second unweighted lateral position estimates from the first and second synchronous servo channels;

a first summing node coupled to receive the first unweighted lateral position estimate at a first input and the first offset term at a second input;

a second summing node coupled to receive the second unweighted lateral position estimate at a first input and the second offset term at a second input;

a first multiplying node coupled to receive an output from the first summing node at a first input and the first weight signal at a second input and operable to output a first offset weighted lateral position estimate;

a second multiplying node coupled to receive an output from the second summing node at a first input and the second weight signal at a second input and operable to output a second offset weighted lateral position estimate; and a third summing node coupled to receive the first and second offset weighted lateral position estimates and operable to output a combined offset weighted lateral position estimate to a track-following servomechanism.

2. The timing-based servo module of claim 1, further comprising:
- a first switching node comprising:
  - a first input terminal coupled to receive the first lateral position estimate variance output from the first synchronous servo channel;
  - a second input terminal coupled to receive a first dataValid flag output from the first synchronous servo channel; and
  - an output terminal coupled to transmit the first lateral position estimate variance to the weight computation module when the first dataValid flag is in a first state and not transmit the first lateral position estimate variance to the weight computation module when the first dataValid flag is in a second state, the first dataValid flag being in the second state in response to a loss of timing event experienced by the first synchronous servo channel; and
- a second switching node comprising:
  - a first input terminal coupled to receive the second lateral position estimate variance output from the second synchronous servo channel;
  - a second input terminal coupled to receive a second dataValid flag output from the second synchronous servo channel; and
  - an output terminal coupled to transmit the second lateral position estimate variance to the weight computation module when the second dataValid flag is in the first state and not transmit the second lateral position estimate variance to the weight computation module when the second dataValid flag is in the second state, the second dataValid flag being in the second state in response to a loss of timing event experienced by the second synchronous servo channel.

3. The timing-based servo module of claim 1, further comprising:
- a first low pass filter interposed between the first output of the offset computation module and the second input of the first summing node;
- a second low pass filter interposed between the second output of the offset computation module and the second input of the second summing node;
- a third low pass filter interposed between the first output of the weight computation module and the second input of the first multiplying node; and
- a fourth low pass filter interposed between the second output of the weight computation module and the second input of the second multiplying node.

4. A data storage tape drive, comprising:
- a host interface coupled to a host device and operable for transmitting and receiving commands and data to and from the host device;
- a write processing module coupled to receive data to be written from the host interface;
- a write channel coupled to receive processed write data from the write processing module;
- a write head coupled to receive the write data from the write channel and operable to record the data onto a data tape moving past the write head, the data tape including at least one data track between a pair of servo bands;
- a read head operable to read data from the data tape moving past the read head, the read head including first and second servo elements for reading servo data from the servo bands;
- a read channel coupled to receive the data read by the read head;
- a read processing module coupled to receive unprocessed read data from the read channel and transmit processed read data to the host interface;
- a first synchronous servo channel coupled to receive a first digital servo signal read from the data tape by the first servo element, the first synchronous servo channel comprising:
  - a first output for a first unweighted lateral position estimate; and
  - a second output for a first lateral position estimate variance;
- a second synchronous servo channel coupled to receive a second digital servo signal read from the data tape by the second servo element, the second synchronous servo channel comprising:
  - a first output for a second unweighted lateral position estimate; and
  - a second output for a second lateral position estimate variance;
- a weight computation module operable to:
  - divide the first lateral position estimate variance by the sum of the first and second lateral position estimate variances to provide a first weight signal; and divide the second lateral position estimate variance by the sum of the first and second lateral position estimate variances to provide a second weight signal;

an offset computation module operable to provide a first offset term and a second offset term using first and second measures of reliability of the first and second synchronous channels and the first and second unweighted lateral position estimates from the first and second synchronous servo channels;

a first summing node coupled to receive the first unweighted lateral position estimate and the first offset term;

a second summing node coupled to receive the second unweighted lateral position estimate and the second offset term;

a first multiplying node coupled to receive an output from the first summing node and the first weight signal and operable to output a first offset weighted lateral position estimate;

a second multiplying node coupled to receive an output from the second summing node and the second weight signal and operable to output a second offset weighted lateral position estimate; and a third summing node coupled to receive the first and second offset weighted lateral position estimates and operable to output a combined offset weighted lateral position estimate to a track-following servomechanism.

5. The tape drive of claim 4, further comprising:

a first switching node comprising:
 a first input terminal coupled to receive the first lateral position estimate variance output from the first synchronous servo channel;
 a second input terminal coupled to receive a first dataValid flag output from the first synchronous servo channel; and
 an output terminal coupled to transmit the first lateral position estimate variance to the weight computation module when the first dataValid flag is in a first state and not transmit the first lateral position estimate variance to the weight computation module when the first dataValid flag is in a second state, the first dataValid flag being in the second state in response to a loss of timing event experienced by the first synchronous servo channel; and a second switching node comprising:
 a first input terminal coupled to receive the second lateral position estimate variance output from the second synchronous servo channel;
 a second input terminal coupled to receive a second dataValid flag output from the second synchronous servo channel; and
 an output terminal coupled to transmit the second lateral position estimate variance to the weight computation module when the second dataValid flag is in the first state and not transmit the second lateral position estimate variance to the weight computation module when the second dataValid flag is in the second state, the second dataValid flag being in the second state in response to a loss of timing event experienced by the second synchronous servo channel.

6. The tape drive of claim 4, further comprising:

a first low pass filter interposed between the first output of the offset computation module and the second input of the first summing node;

a second low pass filter interposed between the second output of the offset computation module and the second input of the second summing node;

a third low pass filter interposed between the first output of the weight computation module and the second input of the first multiplying node; and a fourth low pass filter interposed between the second output of the weight computation module and the second input of the second multiplying node.

7. A computer program product of a non-transitory computer readable medium usable with a programmable computer, the computer program product having computer-readable code embodied therein for providing information to a track-following servomechanism from parallel channels of a timing-based servo module in a linear tape drive, the computer-readable code comprising instructions for:

receiving a first digital servo signal read from a data tape by a first servo element associated with a first synchronous servo channel;

generating a first unweighted lateral position estimate from the first digital servo signal;

generating a first lateral position estimate variance from the first digital servo signal;

receiving a second digital servo signal read from the data tape by a second servo element associated with a second synchronous servo channel;

generating a second unweighted lateral position estimate from the second digital servo signal;

generating a second lateral position estimate variance from the second digital servo signal;

dividing the first lateral position estimate variance by the sum of the first and second lateral position estimate variances to generate a first weight signal;

dividing the second lateral position estimate variance by the sum of the first and second lateral position estimate variances to generate a second weight signal;

providing a first offset term and a second offset term using first and second measures of reliability of the first and second synchronous channels and the first and second unweighted lateral position estimates from the first and second synchronous servo channels;

adding the first unweighted lateral position estimate and the first offset term to generate a first sum;

adding the second unweighted lateral position estimate and the second offset term to generate a second sum;

multiplying the first sum and the first weight signal to generate a first offset weighted lateral position estimate;

multiplying the second sum and the second weight signal to generate a second offset weighted lateral position estimate;

adding the first and second offset weighted lateral position estimates to generate a combined offset weighted lateral position estimate; and transmitting the combined offset weighted lateral position estimate to a track-following servomechanism.

8. The computer program product of claim 7, wherein:

dividing the first lateral position estimate variance by the sum of the first and second lateral position estimate variances comprises dividing first lateral position estimate variance by the first lateral position estimate variance in response to a loss of timing event experienced by the second synchronous servo channel; and dividing the second lateral position estimate variance by the sum of the first and second lateral position estimate variances comprises dividing second lateral position estimate variance by the second lateral position estimate variance in response to a loss of timing event experienced by the first synchronous servo channel.

9. The computer program product of claim 7, wherein the instructions further comprise:

low pass filtering the first offset term before it is input to the first summing node;

low pass filtering the second offset term before it is input to the second summing node;
low pass filtering the first weight signal before it is input to the first multiplying node; and low pass filtering the second weight signal before it is input to the second multiplying node.

* * * * *